(12) United States Patent
Ostrowski

(10) Patent No.: US 7,690,074 B2
(45) Date of Patent: Apr. 6, 2010

(54) CONNECTING DEVICE FOR A WIPER BLADE ON THE WIPER ARM OF A WINDSHIELD WIPER SYSTEM

(75) Inventor: Wolfgang Ostrowski, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 879 days.

(21) Appl. No.: 11/270,060

(22) Filed: Nov. 9, 2005

(65) Prior Publication Data

US 2006/0059647 A1    Mar. 23, 2006

Related U.S. Application Data

(63) Continuation of application No. PCT/EP2004/004447, filed on Apr. 28, 2004.

(30) Foreign Application Priority Data

May 9, 2003    (DE) ................................. 103 20 930
May 9, 2003    (DE) ................................. 103 20 932

(51) Int. Cl.
*B60S 1/40* (2006.01)
(52) U.S. Cl. .............................. 15/250.32; 15/250.351; 15/250.43; 15/250.201
(58) Field of Classification Search .............. 15/250.32, 15/250.351, 250.43, 250.44, 250.31, 250.201
See application file for complete search history.

(56) References Cited

U.S. PATENT DOCUMENTS

| 4,949,422 A | 8/1990 | Bauer et al. |
| 5,885,023 A | 3/1999 | Witek et al. |
| 6,158,078 A | 12/2000 | Kotlarski |
| 6,279,191 B1 | 8/2001 | Kotlarski et al. |
| 6,499,181 B1 | 12/2002 | Kotlarski |

(Continued)

FOREIGN PATENT DOCUMENTS

DE    44399    8/1888

(Continued)

OTHER PUBLICATIONS

European Office Action dated Nov. 28, 2008.

*Primary Examiner*—Gary K Graham

(57) ABSTRACT

The invention relates to a connecting device for a blade on the wiper arm of a windshield wiper system, the wiper blade being formed by a springy support element that is provided with a wiper strip. The inventive connecting device comprises a holding mechanism that is fastened to the outer edges of the support element, and a connecting bolt which is disposed on the holding mechanism and runs transversal to the longitudinal extension of the wiper blade. The aim of the invention is to design such a connecting device in such a way that the parts which are subject to wear are placed on the wiper blade. The aim is achieved by the fact that an adapter bracket is hinged to the connecting bolt. The final piece of the wiper arm, which is adapted to the adapter bracket, can be joined in a fixed and detachable manner to the adapter bracket via a locking connection or latch and is connected thereto in a fixed manner in the assembled state of the wiper blade. Moreover, the adapter bracket us embodied such that the connecting bolt, and thus also the wiper blade, is able to perform a swinging movement relative thereto the swinging movement being due to and determined by a curvature of the vehicle window.

5 Claims, 18 Drawing Sheets

U.S. PATENT DOCUMENTS

| | | | |
|---|---|---|---|
| 6,654,983 B1 * | 12/2003 | Raynaud | 15/250.32 |
| 6,718,594 B1 | 4/2004 | Kotlarski | |
| 7,305,734 B2 * | 12/2007 | Boland et al. | 15/250.32 |

FOREIGN PATENT DOCUMENTS

| | | | |
|---|---|---|---|
| DE | 1 750 701 | | 8/1957 |
| DE | 1088373 B | | 9/1960 |
| DE | 1 176 503 | | 8/1964 |
| DE | 1 200 704 | | 9/1965 |
| DE | 2 324 702 | | 12/1974 |
| DE | 28 17 224 | | 10/1979 |
| DE | 34 24 729 A1 | | 2/1986 |
| DE | 35 30 956 C2 | | 3/1986 |
| DE | 36 32 733 C2 | | 6/1988 |
| DE | 296 11 722 U1 | | 12/1997 |
| DE | 197 29 864 A1 | | 1/1999 |
| DE | 197 29 865 A1 | | 1/1999 |
| DE | 197 47 901 A1 | | 5/1999 |
| DE | 199 35 861 A1 | | 2/2001 |
| DE | 100 43 427 A1 | | 3/2002 |
| DE | 697 11 324 T2 | | 3/2002 |
| DE | 100 03 589 A1 | | 4/2002 |
| DE | 10130903 | * | 5/2002 |
| EP | 0 356 079 A2 | | 2/1990 |
| EP | 1 120 320 A2 | | 8/2001 |
| FR | 1 235 573 | | 7/1960 |
| FR | 2 371 321 | | 6/1978 |
| FR | 2 403 245 | | 4/1979 |
| FR | 2 768 979 | | 4/1999 |
| FR | 2788027 | * | 7/2000 |
| GB | 1 405 579 | | 9/1975 |
| GB | 1 568 131 | | 5/1980 |
| JP | 2000/168507 A | | 6/2000 |
| JP | 2002/308062 A | | 10/2002 |
| WO | 99/36300 | | 7/1999 |
| WO | 00/05113 | | 2/2000 |
| WO | 02/40328 A1 | | 5/2002 |
| WO | 02/052917 A2 | | 7/2002 |
| WO | 03/084789 A1 | | 10/2003 |

* cited by examiner

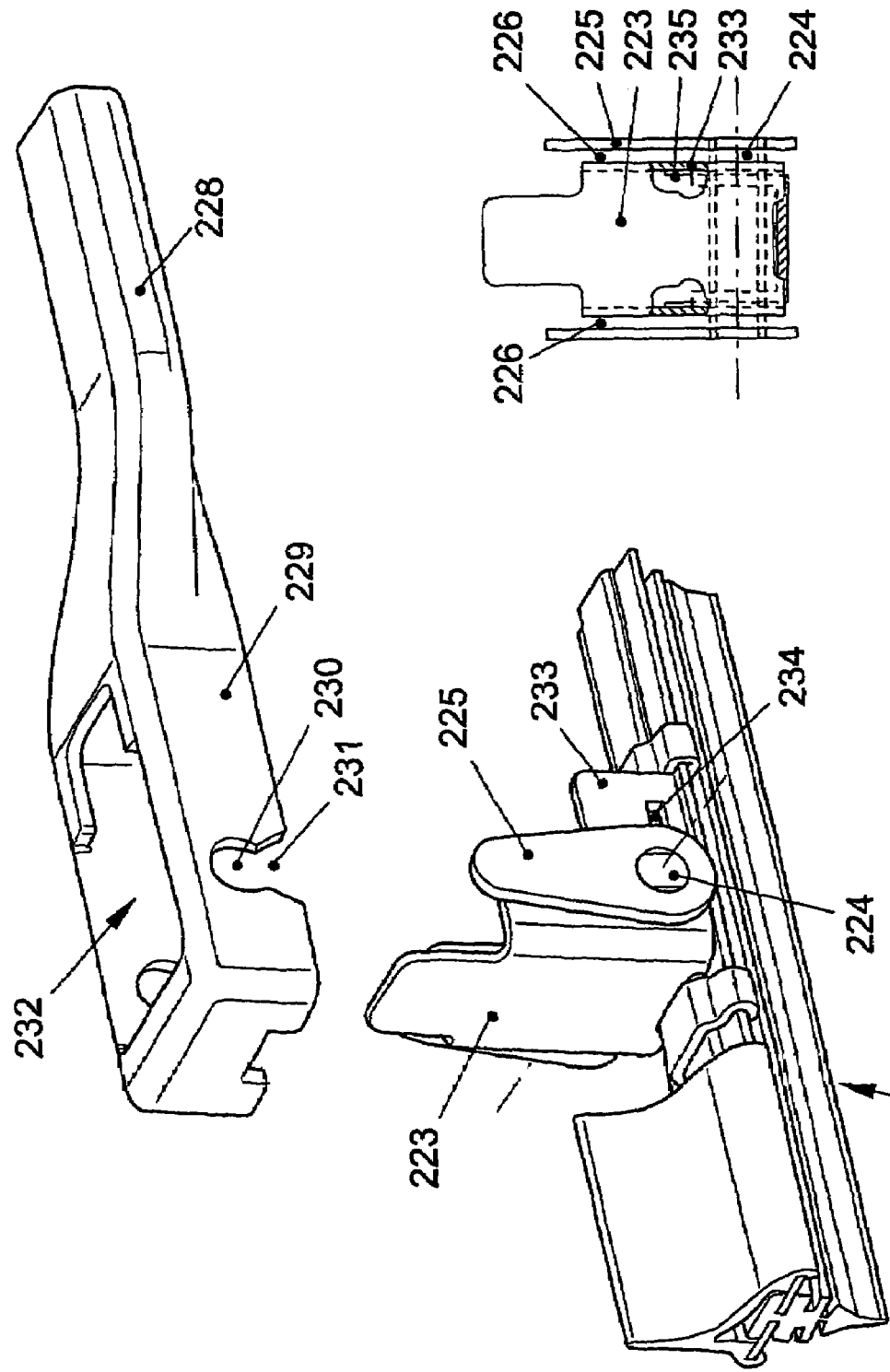

CONNECTING DEVICE FOR A WIPER BLADE ON THE WIPER ARM OF A WINDSHIELD WIPER SYSTEM

CROSS-REFERENCE TO RELATED APPLICATION

This is a continuing application, under 35 U.S.C. §120, of copending international application PCT/EP2004/004447, filed Apr. 28, 2004, which designated the United States; this application also claims the priority, under 35 U.S.C. §119, of German patent application No. DE 103 20 930.1, filed May 9, 2003, and German patent application No. DE 103 20 932.8, filed May 9, 2003; the prior applications are herewith incorporated by reference in their entirety.

BACKGROUND OF THE INVENTION

Field of the Invention

The invention relates to a connecting device for a wiper blade on the wiper arm of a windshield wiper system for a vehicle, in particular for a wiper blade arranged next to the wiper arm in the projection on the windshield.

Wiper blades are mounted to the wiper arm of a windshield wiper system through a connecting device, directly or via a complicated clip system. The direct mounting is associated with the advantage of a small construction height. Solutions with an arrangement of this type are described, for example, in German published patent applications DE 23 24 702, DE 34 24 729 A1, DE 197 29 864 A1, DE 197 29 865 A1, DE 199 35 861, in German utility model (Gebrauchsmuster) DE 296 11 722 U1 and in international publication WO 99/36300. A wiper blade for an configuration of this type generally has a curved, elastic support and a wiper strip with a wiping lip which, owing to a contact pressure applied to the wiper blade by the wiper arm, bears elastically against the particular window of the vehicle.

The windshield wiper described in U.S. Pat. No. 6,279,191 B1 and German published patent application DE 197 29 864 A1 has a wiper blade with a resilient supporting element for the wiper strip, on the side of which supporting element which faces away from the window the connecting device, which can be connected to the driven wiper arm, is secured, the connecting device being assigned to a recess in the wiper strip. The supporting element, which is formed from two parallel spring rails, engages in two longitudinal grooves formed opposite each other on the wiper strip and is secured in the longitudinal grooves by a holder (holding device) fitting over the outer longitudinal edges of the spring rails. The holder has two flange-like extensions which extend in the longitudinal direction of the supporting element, are arranged perpendicularly to the window and extend away from the latter and to which a hinge bolt, which is arranged transversely to the longitudinal extent of the wiper blade and approximately in the wiping direction thereof and is intended for a bearing receptacle formed on the wiper arm, is fastened.

Furthermore, German published patent application DE 100 03 589 A1 describes a connecting device for a wiper blade for arrangement on the wiper arm of a windshield wiper system for motor vehicle windows, which connecting device is formed from a hinge bolt (connecting bolt) arranged fixedly on the wiper blade and a hollow cylindrical latching receptacle, which is formed as a pivot bearing on the wiper arm and has a gap-shaped recess in the radial direction for the hinge bolt. The connecting bolt is flattened, with the thickness of the flattened region being identical to or greater than the width of the recess. In the predetermined working position of the wiper blade on the wiper arm, the radial direction wherein the recess is formed is provided transversely to the flattening and, in the installation position, is provided parallel to the flattening (latching position). In order to permit removal of a wiper blade from or installation of a wiper blade on the wiper arm, the latter has to be folded away from the motor vehicle window, and the wiper blade is to be pivoted into the installation or removal position or is to be assigned to the wiper arm and is to be brought with the connecting bolt out of and into engagement with the latching receptacle. The wiper blade is then to be pivoted into a parallel arrangement with the wiper arm and the latter is to be pivoted about essentially 90° into the working and bearing position on the motor vehicle window. In this position (latching position), the wiper blade is reliably secured on the wiper arm in a simple manner. However, the installation and removal of the wiper blade are relatively complicated.

In the case of the previously described connecting devices, both the device elements arranged on the end piece of the wiper arm and those arranged on the wiper blade are subject to wear.

SUMMARY OF THE INVENTION

It is accordingly an object of the invention to provide a connecting device for mounting a wiper blade to a wiper arm of a windshield wiper system which overcomes the above-mentioned disadvantages of the heretofore-known devices and methods of this general type and which is improved so that the elements that are subject to wear are disposed on the wiper blade or substantially on the wiper blade.

With the foregoing and other objects in view there is provided, in accordance with the invention, a connecting device for a wiper blade on the wiper arm of a vehicle wiper system, the wiper blade being formed from a resilient supporting element with a wiper strip, the connecting device comprising:

a holding device fastened to outer edges of the supporting element;

a connecting bolt disposed on the holding device and extending transversely to a longitudinal extent of the wiper blade;

an adapter bracket articulated on the connecting bolt;

an end piece disposed on the wiper arm and matched to the adapter bracket for releasably connecting the end piece to the adapter bracket via a latching connection or locking means and fixedly connecting in an assembled state; and the adapter bracket being configured to enable the connecting bolt, and the wiper blade, to execute a swinging movement relative to the adapter bracket, with the swinging movement being caused and defined by an arching of the windshield.

In other words, the invention involves a connecting device for a wiper blade on the wiper arm of a windshield wiper system, which connecting device has (in a known manner) a holding device fixed on the wiper blade and a connecting bolt which is arranged on the holding device and extends transversely to the longitudinal extent of the wiper blade, wherein connecting device an adapter bracket is arranged between the holding device and the end piece of the wiper arm. The adapter bracket is coupled to the connecting bolt and guided on the holding device, corresponds with the end piece of the wiper arm and is arranged on the wiper arm by means of this matched end piece via a releasable connection, for example a latching connection or a locking means. In this case, the adapter bracket is designed in such a manner that the connecting bolt, and therefore also the wiper blade, can carry out a swinging movement in relation to the adapter bracket, and therefore also in relation to the wiper arm, which swinging movement is caused and determined by the arching of the vehicle window. The adapter bracket, which is arranged in a fixed position on the end piece of the wiper arm as a fixed component of the wiper blade, is therefore a means of imparting movement between the wiper blade and the wiper arm and at the same time is a securing element for the latter. The elements permitting a movement of the wiper blade in relation to the wiper arm and the guide between the adapter bracket and the holding device are therefore exclusively formed on the wiper blade. Hence, only the wiper blade is to be regarded as a wearing part of the windshield wiper. The installation of a wiper blade on and removal of a wiper blade from the wiper arm is possible in a simple and error-free manner. The connection produced between them is stable and robust and withstands in particular the loads at high driving speeds.

The adapter bracket is preferably a cast part which is designed in the manner of a hood, is composed of dimensionally stable plastic or metal, in particular light metal, covers the holding device and bears at least partially against the longitudinal sides thereof, which are formed parallel to the longitudinal extent of the wiper blade, with bearings for the connecting bolt being formed on the cast part. The bearings can advantageously be designed as latching receptacles for the ends of the connecting bolt, the latching receptacles being provided in each case with an introductory slot which has an introductory opening on that side of the adapter bracket which faces the wiper blade. As a result, the adapter bracket, with the connecting bolt introduced into the two introductory slots, can be arranged in a simple manner on the connecting bolt and therefore also on the holding device by an exertion of pressure, by means of which the connecting bolt is brought into engagement with the latching receptacles. The adapter bracket is therefore secured in an articulated manner on the holding device and is guided in a tilt-free manner by partially bearing on the latter.

The end piece of the wiper arm is expediently designed in such a manner that it fits over the adapter bracket in a form-fitting manner or substantially form-fitting manner when the wiper blade is arranged on the wiper arm, so that the wiper blade is thereby also secured in a stable and tilt-free manner in its position in relation to the vehicle window.

The adapter bracket is arranged at a distance opposite the wiper blade in order to make it possible for the wiper blade to undergo a swinging movement about the connecting bolt, which swinging movement has to be made possible, due to the arching of the vehicle window, so that the wiper blade in every position on the vehicle window bears against the latter with the required contact pressure. In order to limit the movement, stop surfaces can be formed on both sides of the connecting bolt, on that side of the adapter bracket which faces the wiper blade.

In a further group of embodiments, the end piece engages under the adapter bracket by means of two laterally arranged guide rails. The adapter bracket, on the side facing away from the wiper blade, has a resilient tongue with a latching knob for a latching opening formed on the end piece. In addition, retaining means are provided on the adapter bracket and/or on the holding device, with which retaining means stop means formed on the end piece are in engagement in the working position of the windshield wiper on the vehicle window. The embodiments basically designed in such a manner prevent an erroneous installation of the wiper blade on the wiper arm if the latching of the end piece to the adapter bracket fails. Mirror-inverted wiper blades, for example in the case of an opposed windshield wiper system, can be fitted only on the respectively designated wiper arm.

With the above and other objects in view there is also provided, in accordance with the invention, a connecting device for a wiper blade on a wiper arm of a vehicle wiper system, the wiper blade being formed from a resilient supporting element with a wiper strip. The connecting device comprises:

a holding device fastened to the supporting element;

a connecting bolt rotatably disposed about an axis thereof and rotationally fixed on an adapter bracket, the connecting bolt extending transversely to a longitudinal extent of the wiper blade and the wiper arm, the connecting bolt having flattened connecting studs formed with flattened sides;

the wiper arm having an end piece formed with latching receptacles;

the flattened sides of the connecting studs, in an installation position, being arranged in a direction of radial recesses formed at the latching receptacles and, in a latching position, with the adapter bracket latched to the end piece, the connecting studs engaging the latching receptacles in a form fit and extending substantially transversely to the direction of the radial recesses.

That is, the invention also involves an alternative connecting device. In the alternative embodiment of the invention, the connecting bolt is flattened at both ends and shaped to form connecting studs, or, as an alternative, is designed in the form of two flattened connecting studs for hollow cylindrical latching receptacles with a respective recess formed in the radial direction. In this case, the connecting bolt or the connecting studs is/are mounted rotatably about its/their axis on the holding device and is/are connected in a rotationally fixed manner to an adapter bracket, and the latching receptacles are arranged fixedly on the end piece of the wiper arm. As an alternative to this, the connecting bolt or the connecting studs may also be arranged fixedly on the wiper arm and the latching receptacles may be arranged pivotally on the holding device and are connected here in a rotationally fixed manner to the adapter bracket. In this case, the connecting studs, in an installation position, are oriented with their flattened sides in the direction of the recesses, either by rotation of the same, or, in the case of connecting studs arranged fixedly on the wiper blade, by pivoting of the entire wiper blade, and, in the operating position on the vehicle window, wherein the connecting studs, with the adapter bracket with the recesses latched to the end piece, are in form-fitting engagement with one another, are oriented essentially transversely to the direction of the recesses and are therefore latched therein.

A connecting device of this type also permits simple installation of a wiper blade on the wiper arm and at the same constitutes a reliable connection between them in the operational position (at the same time latching position) on the vehicle window. Erroneous installations are avoided. The connecting device also ensures a swinging movement of the wiper blade on the wiper blade, which swinging movement is caused and determined by the arching of the vehicle window, since the connecting studs and the latching receptacles can execute a relative rotational movement with respect to one another. The connection produced is stable and robust and withstands in particular even the loads at high driving speeds.

Other features which are considered as characteristic for the invention are set forth in the appended claims.

Although the invention is illustrated and described herein as embodied in a connecting device for a wiper blade on the wiper arm of a windshield wiper system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 14A is an exploded perspective view of a further alternative embodiment;

FIG. 14B is an end view of an adapter bracket thereof;

DESCRIPTION OF THE PREFERRED EMBODIMENTS

Numerous embodiments are explained below with reference to drawings, FIGS. 1 to 15. All of these embodiments permit a simple and therefore rapid removal and installation of the wiper blade, which is equipped with a connecting device of this type, from and on the associated wiper arm of a windshield wiper.

Figure 1:
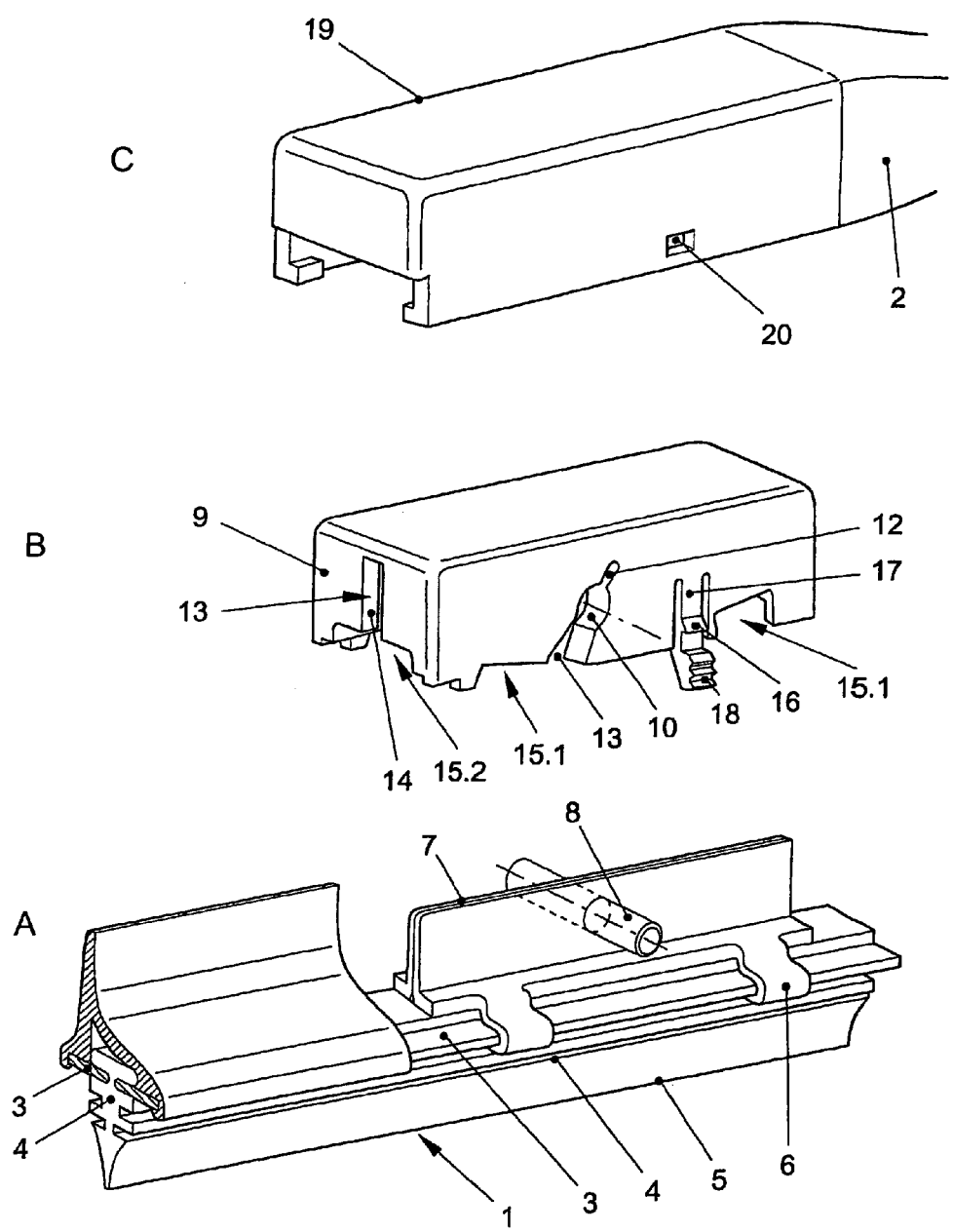
FIG. 1 is an exploded perspective view of the assembly according to the invention.

Referring now to the figures of the drawing in detail and first, particularly, to FIG. 1 and its partial views A, B, and C, there is shown a connecting device for a wiper blade 1 on the wiper arm 2 of a windshield wiper system. The wiper blade 1 has a supporting element, which is formed from two spring rails 3, for a wiper strip 4 with a wiping lip 5 and a holding device 7, which is fastened in a clamping manner to the outer edges of the spring rails 3 by means of claw-like feet 6 and fit over the wiper strip 4 on that side of the spring rails 3 which faces away from the wiping lip 5 and has a connecting bolt 8 which is fastened transversely to the longitudinal extent of the wiper blade 1 in a passage hole. The holding device 7 is arranged in the region of an interrupted spoiler strip, which is likewise secured on the outer edges of the spring rails 3 and fits over the wiper strip 4 and of which one section of one part is illustrated. The connecting bolt 8 serves for the rotational arrangement of an adapter bracket 9, which is illustrated in FIG. 1, part B.

This adapter bracket 9 is a hood-like aluminum cast part of cuboidal design which, in the fitted state, surrounds the holding device 7 and on the longitudinal side walls of which a respective bearing 10 for the connecting bolt 8 is formed. The bearings 10 are provided on that side of the adapter bracket 9 which faces the wiper blade 1 with an introductory slot 11 for the connecting bolt 8 and, on the side opposite the introductory gap 11, have a slot 12 for the elastic expansion of the bearing 10. On both of its end sides, the adapter bracket 9 is provided with a recess 13 which in each case forms two opposite guide surfaces 14 with which the adapter bracket 9 bears in a movable manner against the holding device 7 and by means of which it is guided. By means of the rotatable arrangement of the adapter bracket 9 on the connecting bolt 8 and the end-side guidance thereof on the holding device 7, a swinging movement about the connecting bolt 8 is ensured.

In order to ensure an unobstructed swinging movement, the adapter bracket 9, on its side facing the wiper blade 1, forms a gap in relation to the edges of the spring rails 3 and also has recesses 15.1 and 15.2 which permit an inclination of said adapter bracket about the connecting bolt 8 without obstruction, with the recesses 15.1 serving to receive the feet 6 during a corresponding inclination.

Furthermore, the adapter bracket 9 is provided on its two longitudinal sides with a respective latching lug 16 which is formed on an elastically flexible tongue 17 on the wall of the adapter bracket 9, which tongue is designed at its free end to form a slightly outwardly protruding operating handle 18.

The wiper arm 2 is designed at its free end to form an end piece 19 which is matched to the adapter bracket 9 and can essentially be arranged in a form-fitting manner on the adapter bracket 9 in such a manner that the wiper blade 1 can execute swinging movements without obstruction. In order to fix it on the adapter bracket 9, the end piece 19 has latching recesses 20 which correspond with the latching lugs 16 and wherein the latching lugs 16 engage in the fitted state of the wiper blade 1, for which purpose the latter can be pressed in a simple manner into the end piece 19. In order to remove the wiper blade 1, the operating handles 18 are compressed, as a result of which the latching lugs 16 come out of engagement with the latching recesses 20, and the wiper blade 1 is pulled off from the end piece 19.

Figure 2:
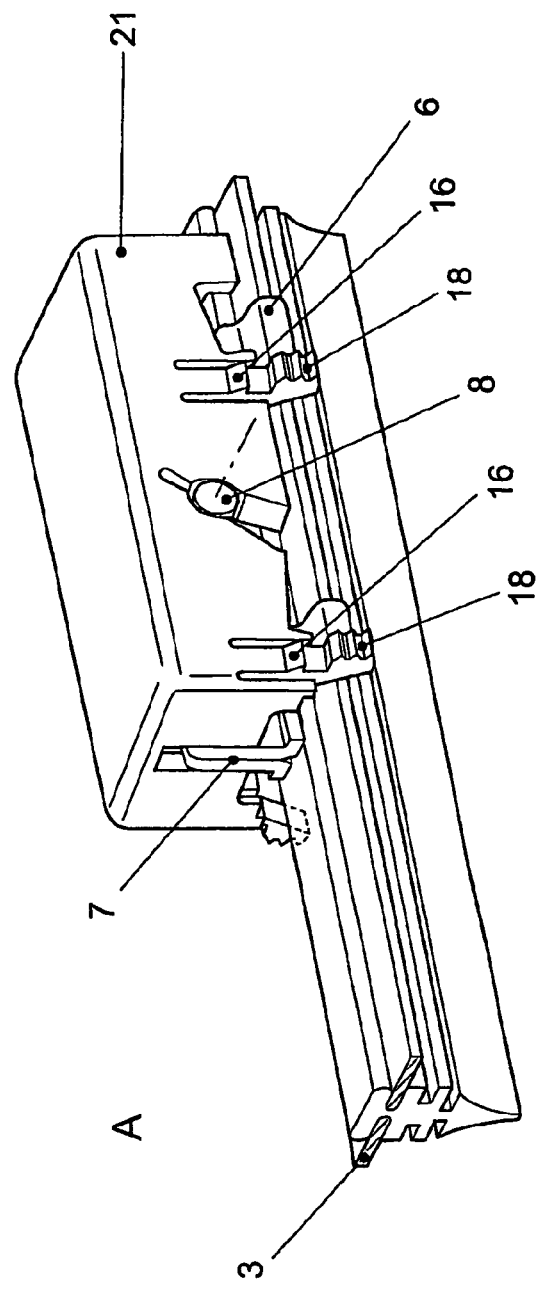
FIG. 2 is a perspective view of a slightly varied embodiment of the assembly.

FIG. 2, with its partial views A and B, shows the embodiment of a connecting device which differs from the previously described embodiment only by the fact that in each case two latching lugs 16 with operating handles 18 are integrally formed on the longitudinal sides of the adapter bracket 21, which latching lugs can be brought into engagement with latching recesses 20 provided on the end piece 22 of the wiper arm 2. The embodiment contributes to increasing the stability of the fastening arrangement. FIG. 2, part A, shows the adapter bracket 21 which is already fitted on the holding device 7 and via which the wiper blade 1 can be pressed in a simple manner into the end piece 22.

Figure 3:
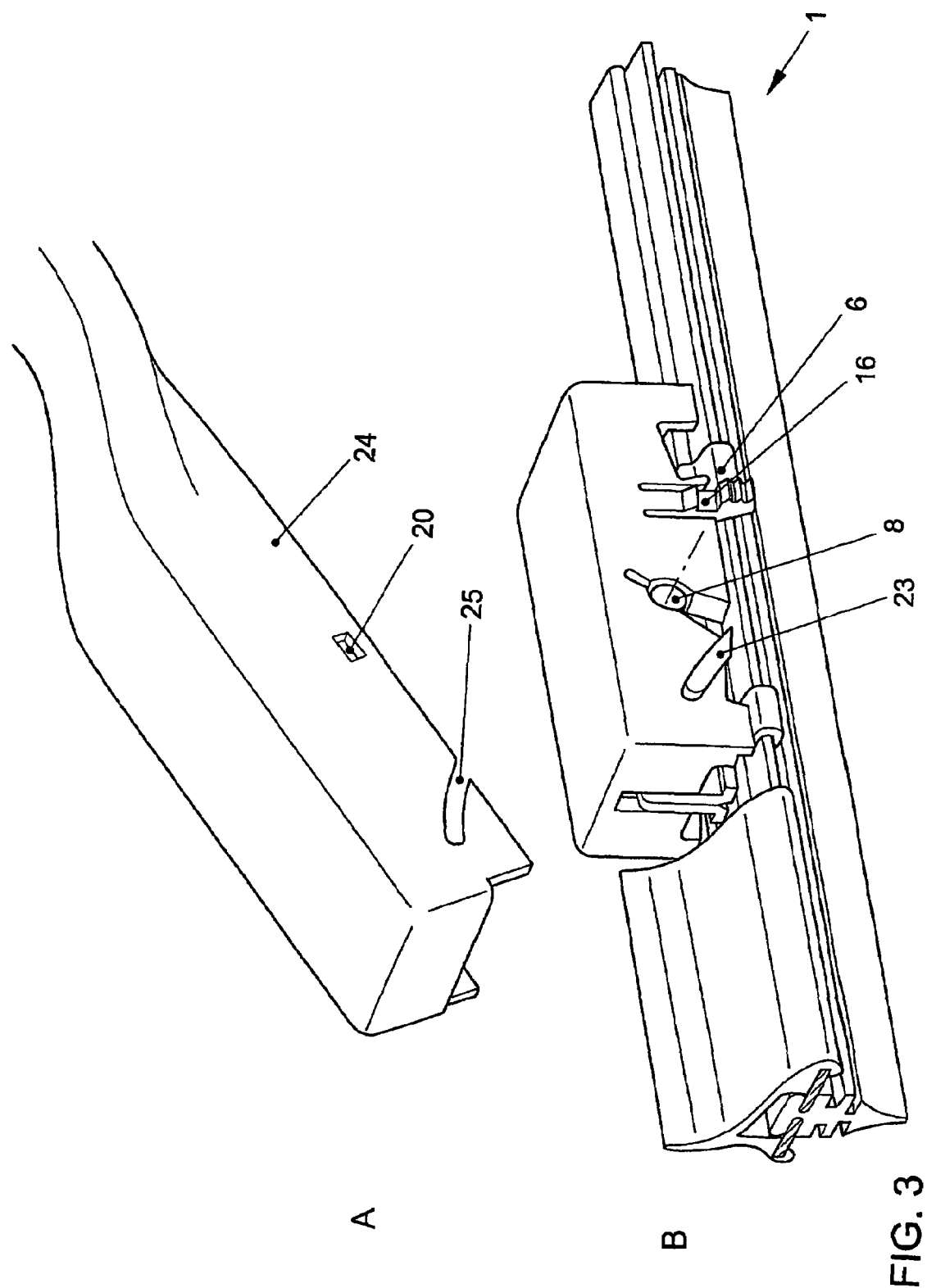
FIG. 3 is a perspective view showing a further embodiment of the assembly.

In the case of the embodiment according to FIG. 3, parts A and B, the one pair of latching lugs is replaced by two curved sliding blocks 23 which can be brought into engagement with gap openings 25 which are formed in the end piece 24 (FIG. 3, part B) and are curved in the same manner. In this case, the curvatures are slightly convex in relation to the latching lugs 16 formed on the other side of the connecting bolt 8, and likewise serve to increase the stability of the fastening arrangement with the effect of providing an additional securing means. However, the installation of the wiper blade 1 on the end piece 24 is associated with an introduction of the sliding blocks 23 into the gap openings 25 and is therefore somewhat more difficult than in the embodiment according to FIG. 2. With increasing penetration of the sliding blocks 23 into the gap openings 25, the angle of inclination of the wiper blade 1 in relation to the end piece 24 becomes ever smaller because of the curvature and, in the latching position, wherein the latching lugs have snapped into the latching recesses 20, is zero.

Figure 4:
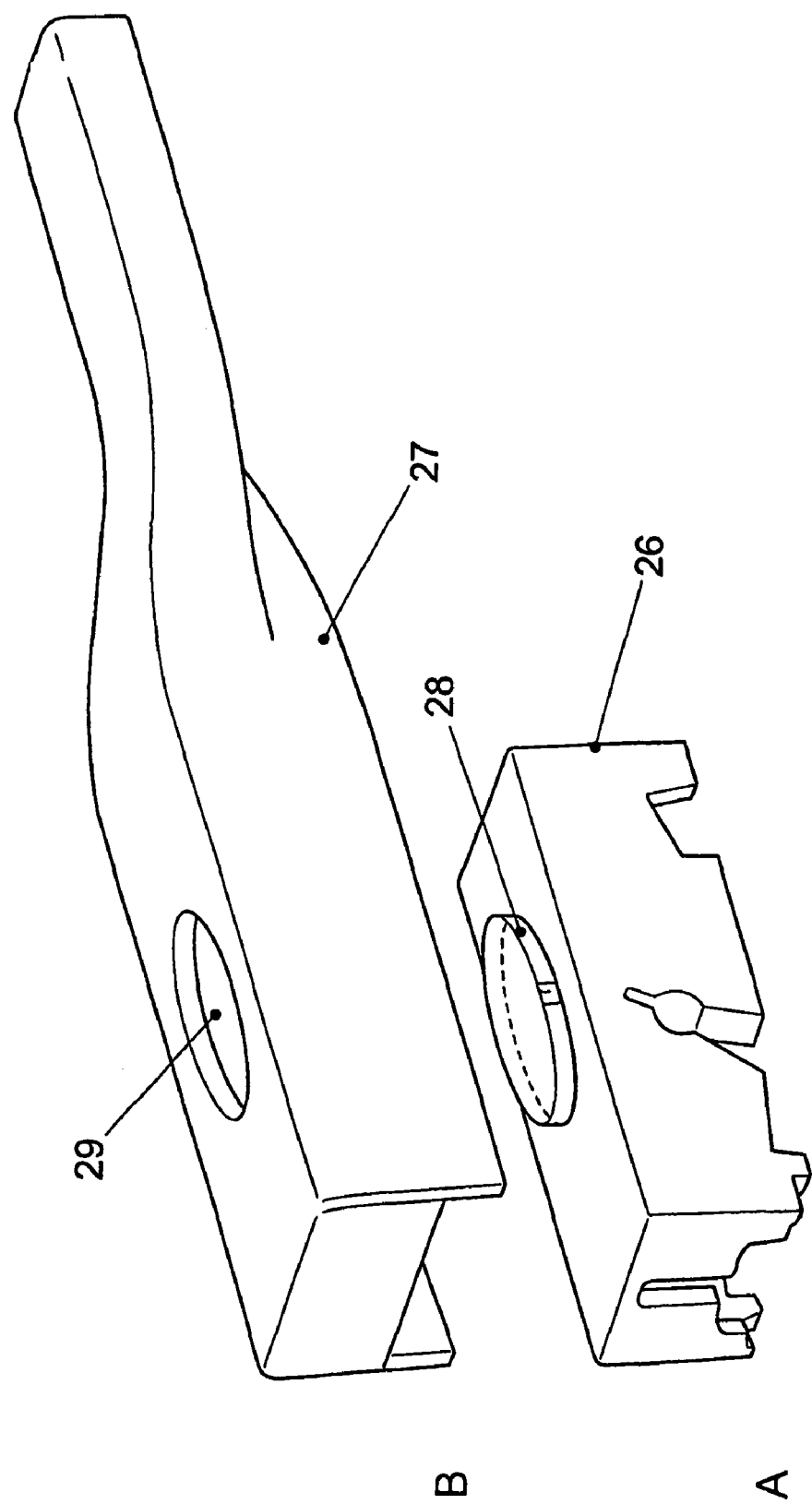
FIGS. 4-10 are partial perspective views of further embodiments of the assembly according to the invention.

FIG. 4, parts A and B, illustrates a further embodiment of a connecting device. In this embodiment, the adapter bracket 26, on its side facing away from the wiper blade 1 and facing the end piece 27, is provided with an elongate rotary knob 28 which is acted upon by spring force (not illustrated) in the direction of the adapter bracket 26 and can be brought into engagement with an opening 29 which is arranged in the end piece 27 and is matched to its design. In the fastening position, wherein the adapter bracket 26 is introduced into the end piece 27, this rotary knob 28 protrudes through the opening 29 with the end piece 27 and beyond said opening and can be grasped, slightly pulled out and rotated, in particular through 90°, the pulling out of the rotary knob being made possible only to the extent that its lower side is level with the upper side of the end piece 27 and can be rotated. By means of the design of the rotary knob 28 and opening 29 and the rotation of the rotary knob 28, the adapter bracket 26 is locked to the end piece 27.

Figure 5:
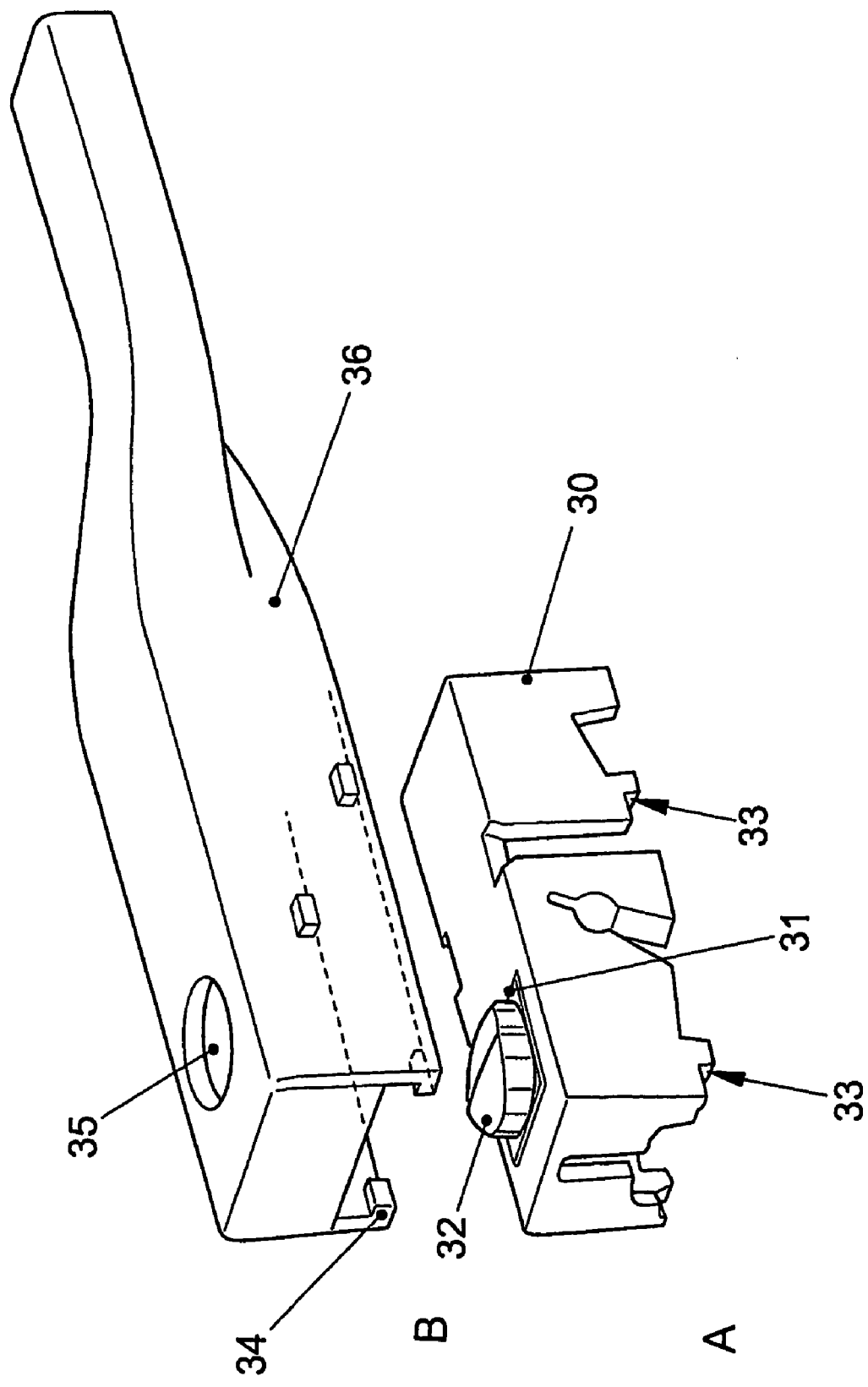

FIG. 5, parts A and B, illustrates a further embodiment of a connecting device with a latching device. A resilient tongue 31 with a latching knob 32 is arranged on the adapter bracket 30, on the side facing away from the wiper blade 1, and, on the side facing the wiper blade 1, latching recesses 33 with stop surfaces for an end piece 36, which is provided with latching projections 34 for said latching recesses and with an opening 35, are arranged on the longitudinal walls of the adapter bracket 30. For installation of the wiper blade 1, the adapter bracket 30 is introduced into the end piece 36 until, with the latching knob 32 being pressed elastically down by the tongue 31, said adapter bracket strikes against the upper wall of the end piece 36. The wiper arm 1 is then displaced with respect to the end piece 36 in the longitudinal direction of the same until the latching projections 34 are completely in engagement with the latching recesses 33. In this position, the latching knob 32 corresponds with the opening 35 and snaps into the latter, as a result of which the adapter bracket is connected fixedly to the end piece 36. A removal of the wiper blade 1 takes place by the latching knob 32 being pressed down and by the wiper blade 1 subsequently being displaced out of the latching position.

Figure 6:
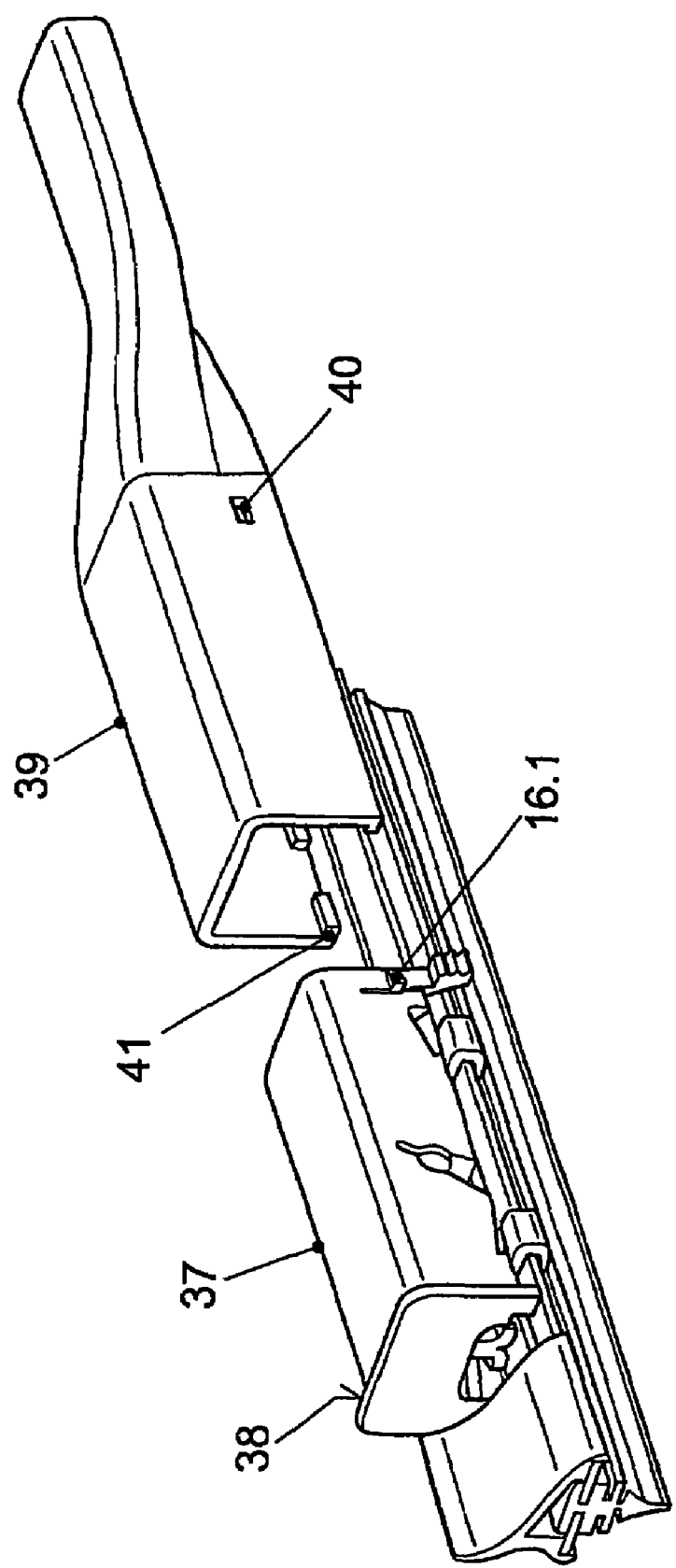

In the case of the embodiment of a connecting device according to FIG. 6, the cuboidal adapter block 37 is provided, on the side facing away from the wiper arm, with an end wall that projects over the side walls and forms a stop surface 38 for the end piece 39. In addition, a latching lug 16.1 is integrally formed on the adapter bracket 37 on its two longitudinal sides. The end piece 36 has latching recesses 40 corresponding with the latching lugs 16.1 in the latching position with the adapter bracket 37 and, on the inside of its longitudinal side walls, inwardly pointing projections 41 for engaging under the adapter bracket 37. By means of a sliding movement along the end piece 39, the wiper blade 1 which is provided with the adapter bracket 37, is pushed into the end piece 39 as far as the stop of the end side thereof on the stop surface 38, with the projections 41 engaging under the adapter bracket 37. In this end position, the latching lugs 16 enter into engagement with the latching recesses 40 and secure the adapter bracket 37 on the end piece.

Figure 7:
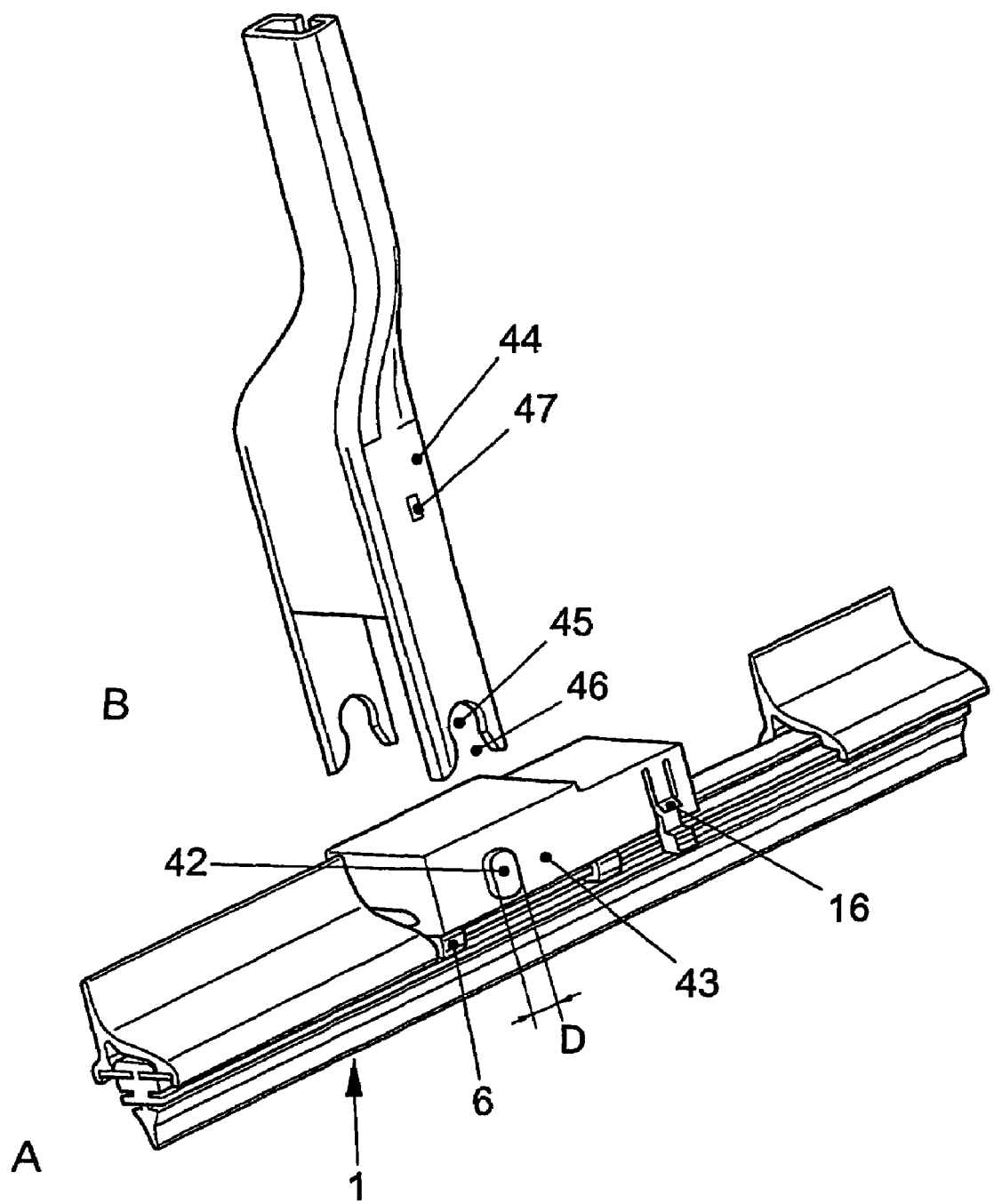

The embodiment of a connecting device according to FIG. 7, parts A and B, is formed from an adapter bracket 43, which is secured in an articulated manner on a connecting bolt 42, and a correspondingly matched end piece 44. The ends of the connecting bolt 42 protrude on the longitudinal sides of the adapter bracket 43 and are flattened, the flattening D being formed essentially perpendicular to the longitudinal extent of the wiper blade 1. In addition, the adapter bracket 43 has two latching lugs 16. The end piece 44 is provided on the end side with two latching receptacles 45 with a respective introductory opening 46 for the flattened ends and with latching recesses 47 for the latching lugs 16, the thickness of the flattened region (D) being essentially identical to the width of the introductory opening 46 at its narrowest point. The wiper blade 1 is introduced perpendicularly to the end piece 44 with the ends of the connecting bolts 42 into the latching receptacles 45, brought through 90° into a parallel position to the wiper arm 2 and thereby into the latching position of the latching lugs 16 with the latching recesses 47. In their latching position, the introductory openings 46 are arranged parallel to the wiper blade 1 and perpendicular to the flattening D, so that the ends of the connecting bolt 42 are likewise fixed as a consequence of the latching in place of the latching lugs 16, and the wiper blade 1 is secured on the wiper arm 2.

Figure 8:
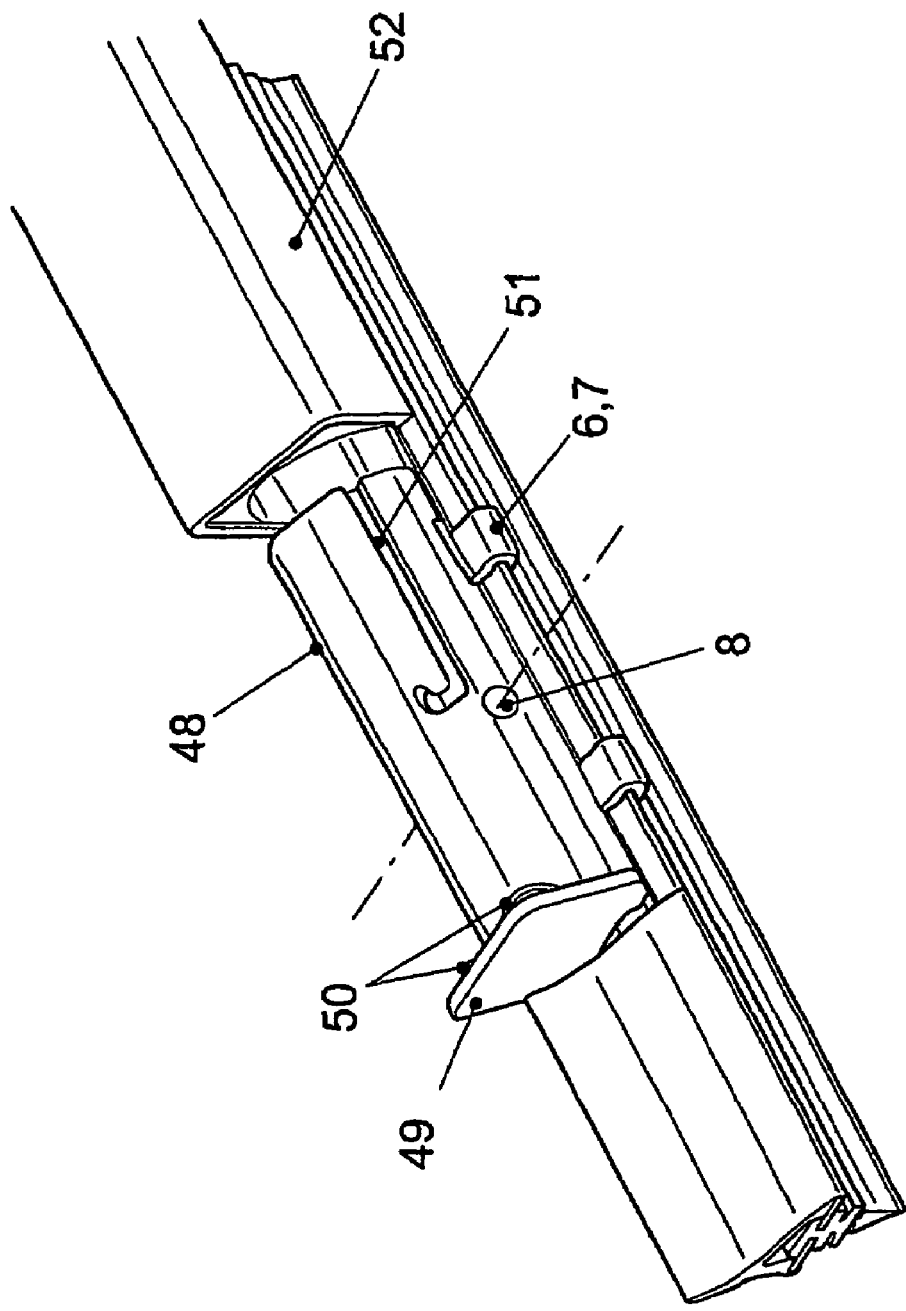

FIG. 8 shows a different design of a connecting device. Here, the adapter bracket 48 is a cast part with a cylindrical lateral surface and, as in the case of the previously described embodiments, is arranged in an articulated manner on the connecting bolt 8 of the holding device 7 and at a distance from the wiper blade 1. On the end side facing away from the end of the wiper arm, the adapter bracket 48 is provided with an end wall 49 which protrudes over the lateral surface and at the same time forms an abutment for spring means 50 arranged on said end wall. Two guide grooves 51 with a respective 1800 bend at the end facing the end wall 49 are provided in the lateral surface, axially parallel and opposite the latter, i.e. offset through 180°. Two guide pins (not illustrated) for engagement with these guide grooves 51 are arranged in the interior of the end piece 52, which is matched to the lateral surface. For installation, the wiper blade 1 is rotated about its longitudinal axis until the guide grooves 51 correspond with the guide pins and are subsequently pushed into the end piece 52 and rotated and latched on the stop, as in the case of a bayonet-type closure, the spring means 50 pressing the adapter bracket 48 into the latching position and holding it therein.

Figure 9:
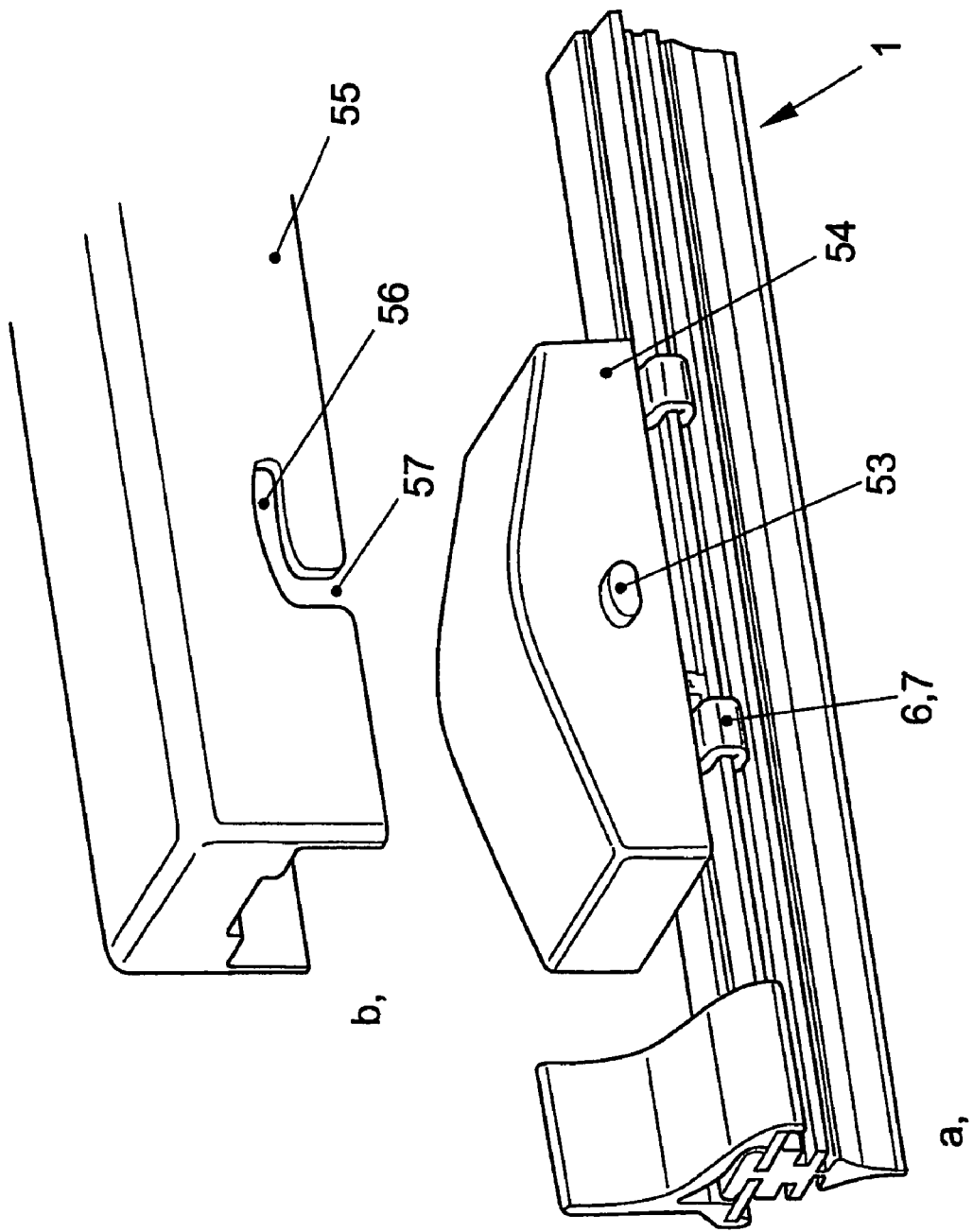

The connecting device shown in FIG. 9 has a connecting bolt 53 (part A) which is connected fixedly to the holding device 7 and whose ends protrude on both sides of an adapter bracket 54 and are flattened parallel to the wiper blade 1 and are slightly curved concavely in relation to the latter. In contrast to the previously described embodiments, the adapter bracket 54 is connected fixedly to the holding device 7, of which only the feet 6 can be seen, and is arched concavely on the side facing away from the wiper blade 1. In both its longitudinal walls, the end piece 55 has a respective elongate slotted guide 56 which corresponds to the respective protruding end of the connecting bolt 53 and the curvature thereof and has an introductory gap 57 on the side facing the wiper arm 1. The introductory gap 57 is the same width as the length of the end of the connecting bolt 53. Installation of the wiper blade 1 takes place in parallel orientation with the end piece 55, by the connecting bolt 53 being pushed over the introductory gap 57 and then, by displacement of the wiper blade 1 in the direction of the wiper arm 2, being pushed into the slotted guide 56. The connecting bolt 53 is guided movably to and fro in said slotted guide and, because of the curvatures, can execute the swinging movements required during operation of the windshield wiper.

Figure 10:
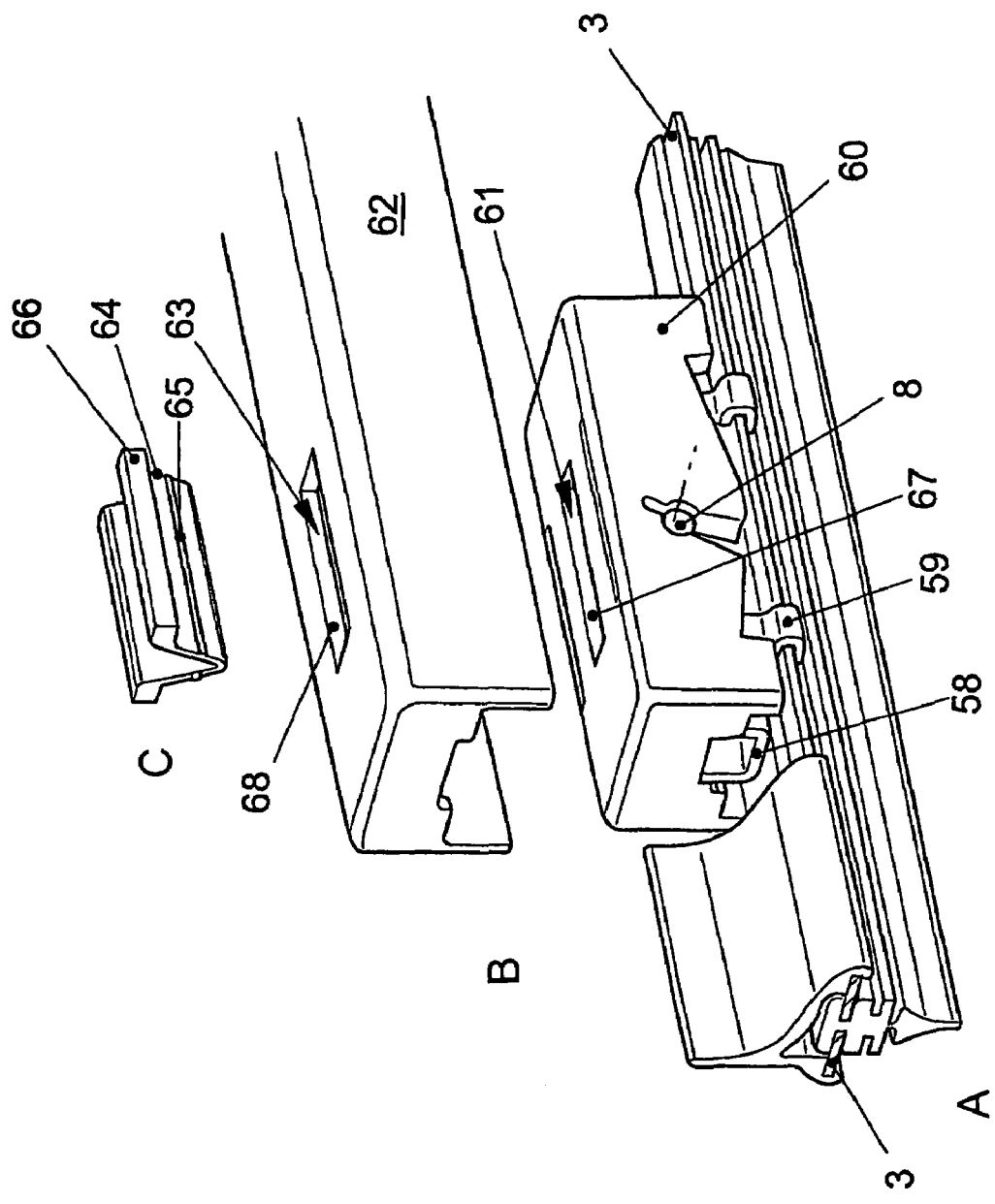

The connecting device shown in partial views A, B, and C of FIG. 10 has a U-shaped holding device 58, which is fastened in a clamping manner to the outer edges of the spring rails 3 by claw-like feet 59. The adapter bracket 60, which is coupled to the connecting bolt 8 on the holding device 58, is provided with a on the side facing away from the wiper blade 1 with a rectangular opening 61 in the region between the limbs of the holding device 58, which opening corresponds with a rectangular, but wider opening 63 formed on the end piece 62. These two openings 61, 63 are assigned a V-shaped, elastically compressible latching element 64 (FIG. 10, part C) which is provided with latching rails 65, which are arranged on its outer sides, and, on its free limb ends, with outwardly pointing stop rails 66, the distance between the latching rails 65 and the stop rails 66 corresponding to the sum of the thicknesses of the walls 67 and 68, which face the wiper blade 1, of the adapter bracket 60 and of the end piece 62. In order to install the wiper blade 1 on the wiper arm 2, the latter is placed into the end piece 62 as far as the stopping of the adapter bracket 60 against the wall 68 and, by introduction of the elastically compressed latching element 64, is latched in place by subsequent expansion of the same.

Figure 11A:
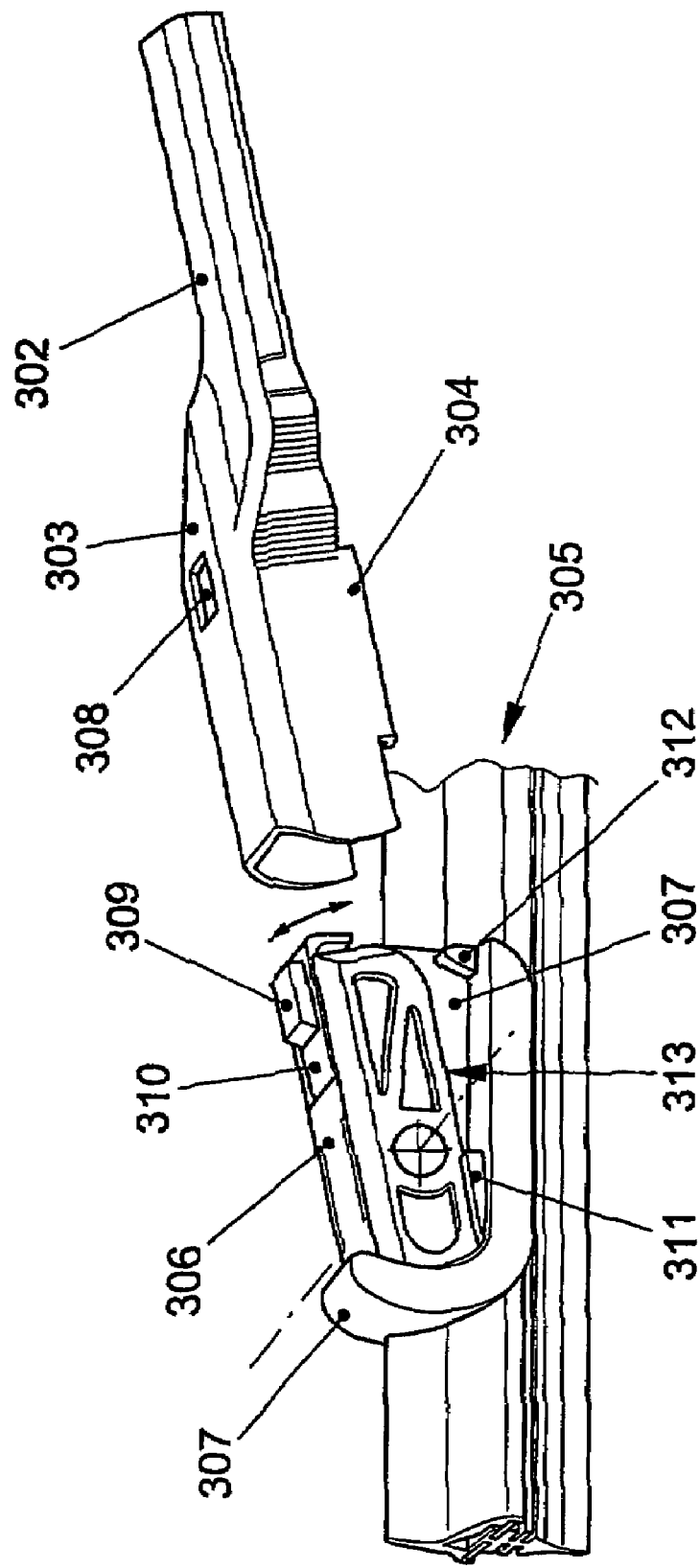
FIGS. 11A, 11B, and 11C are three perspective views illustrating progressive assembly steps of a further embodiment of the invention.
Figure 11B:
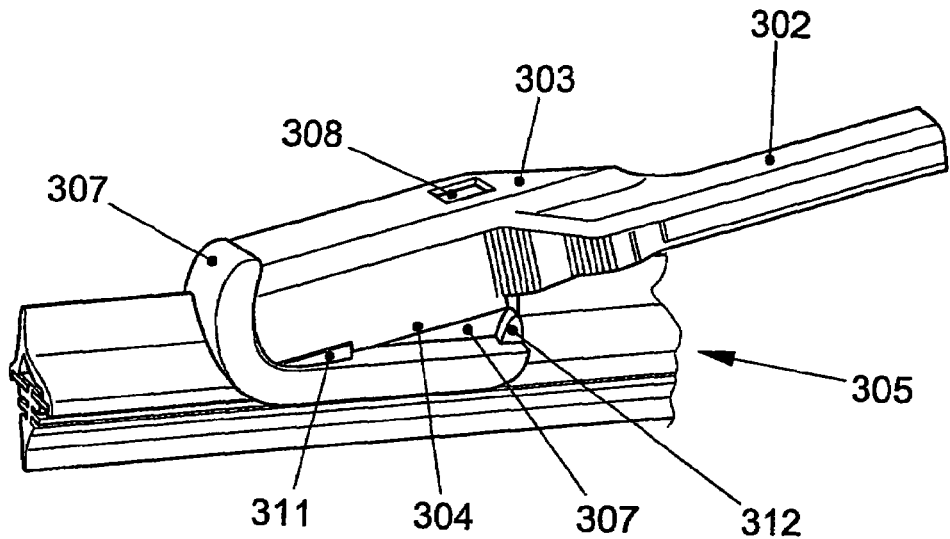
Figure 11C:
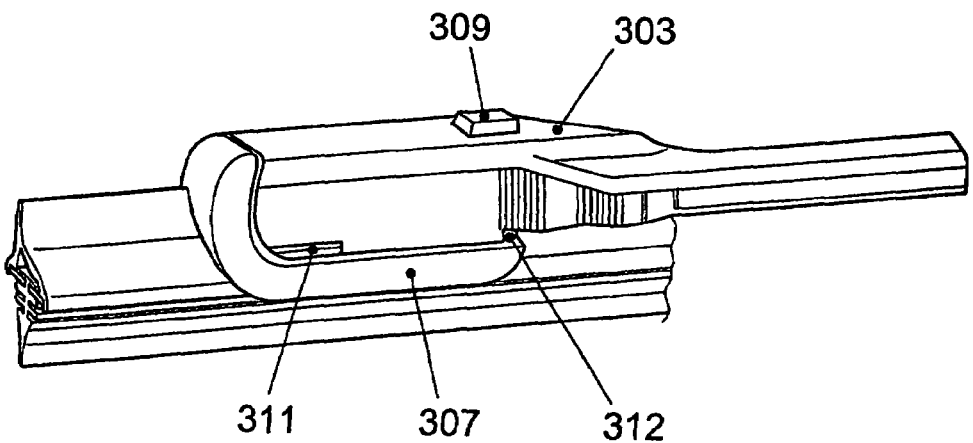

FIGS. 11A to 11C illustrate a connecting device, wherein the end piece 303 formed on the wiper arm 302 has two guide rails 304 for engagement with an adapter bracket 306, which is secured pivotably on the wiper blade 305 by means of a connecting bolt, and with the holding device 307 for said adapter bracket, and also a latching opening 308 for a latching knob 309 arranged on the adapter bracket 306 on a resilient tongue 310. Moreover, a respective wedge-shaped stop bracket 311, which is directed counter to the end piece 303 and permits a pivoting movement of the adapter bracket 306, is formed for the guide rails 304 on both outer sides of the adapter bracket 306. For said guide rails, the holding device 307 also has a respective retaining bracket 312 on both sides at its wiper-arm end. The guide rails 304 serve by means of their two end sides as stop means for the stop brackets 311 and for the retaining brackets 312.

FIGS. 11B and 11C show the installation of the wiper blade 305 on the end piece 303. For this purpose, the adapter bracket 306 is pushed into the end piece 303 in such a manner that its lower edges 313 (FIG. 11A) are engaged from beneath by the guide rails 304, and are pushed until that end side of the respective guide rail 304 which is in front in the push-in direction impacts against the stop bracket 311 directly counter thereto (FIG. 11B). In this position, the latching knob 309 then latches into the latching opening 308, and the end piece 303 and the adapter 306 are latched to each other, so that the wiper blade 305 is fixed on the wiper arm 302. Subsequently, the latter (302) is pivoted with the end piece 303 and with the adapter bracket 306 (not visible) into the working position shown in FIG. 11C, with the guide rails 304 engaging behind the retaining brackets 312. The end piece 303 is therefore fastened captively to the holding device 307, even independently of the latching of the latching knob 309 into the latching opening 308, but is able, during operation on the vehicle window (working position), to execute swinging movements about the connecting bolt in relation to said vehicle window, which swinging movements are caused by the curvature of the window.

Figure 12:
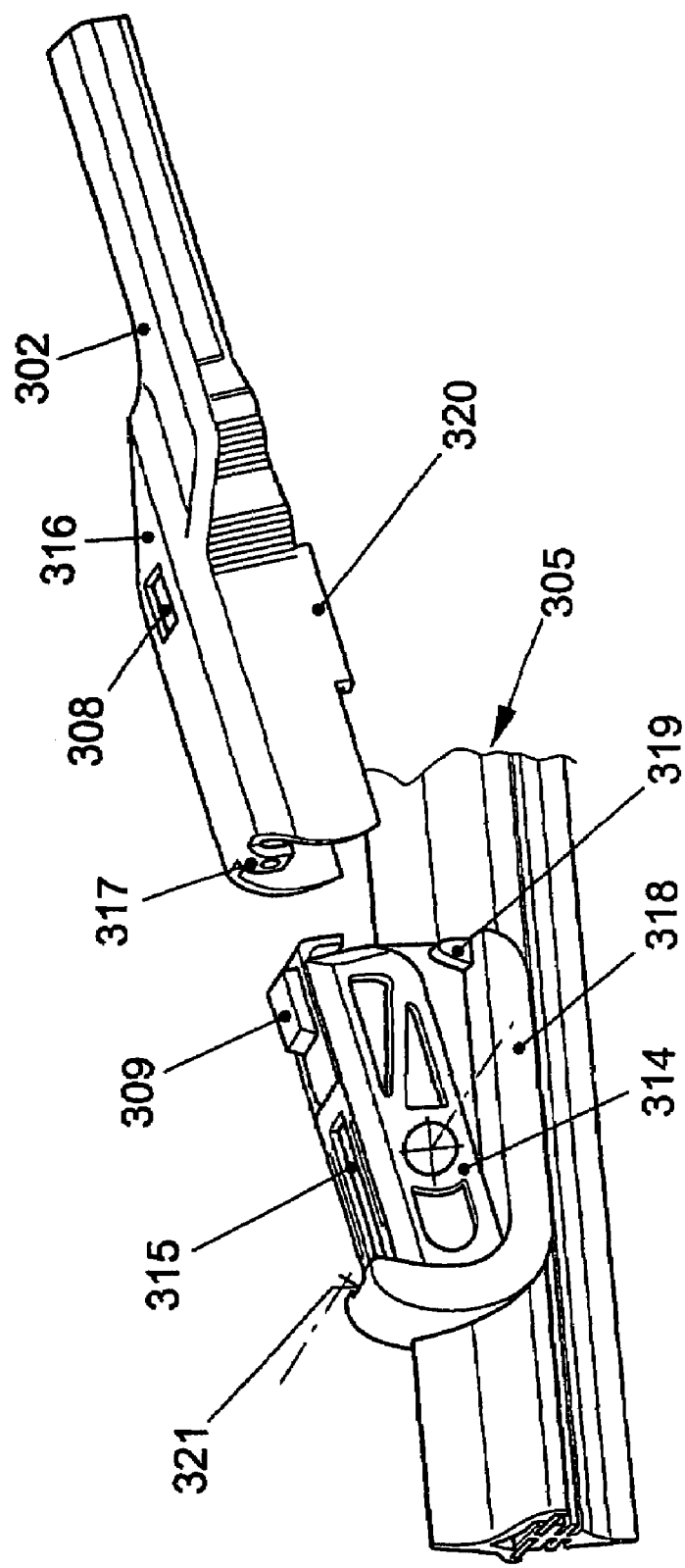
FIG. 12 is a perspective view of an alternative embodiment of the invention.

FIG. 12 shows a further embodiment which differs from the previously described embodiment by the configuration of the retaining and stop means. A guide groove 315 for a stop tab 317, which is arranged on the end side of the end piece 316, is placed on the adapter bracket 314, on the side facing away from the wiper blade 305. The holding device 318 has on both sides at the wiper-arm end a retaining bracket 319 for a respective guide rail 320, which is integrally formed on the end piece, and, on the side facing away from the wiper arm, a hollow with a stop surface 321 for the stop tab 317.

The installation of a wiper blade 305 takes place in the same manner as in the case of the embodiment according to FIGS. 11A to 11C, with the adapter bracket 314, when it is engaged from beneath by the guide rails 320, being pushed into the end piece until the stop tab 317 strikes against the stop surface 321. In this position, the latching knob 309 engages in the latching opening 308, so that the wiper blade 305 is fixed on the end piece 316 of the wiper arm 302. During pivoting of the end piece 316 with the adapter bracket 314 into the working position (cf. FIG. 11C), the two guide rails 320 engage under the retaining brackets 319. The wiper blade 305 is therefore fastened captively to the wiper arm 302 even if a latching of the latching knob 309 to the latching opening 308 has erroneously not taken place.

Figure 13A:
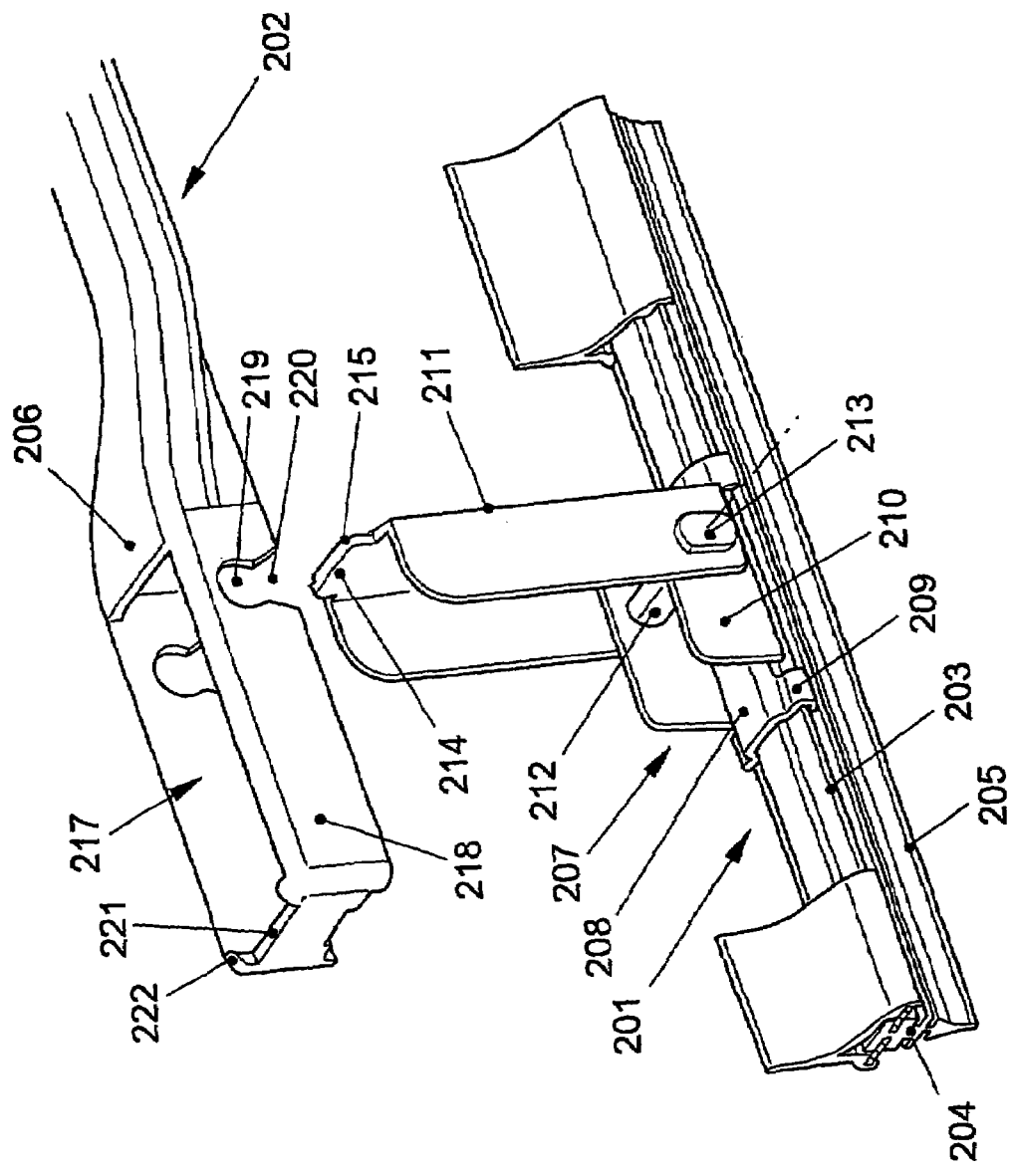
FIGS. 13A and 13B show an alternative connecting device for a wiper blade on an end piece of a wiper arm, in the disassembled and in the assembled position, respectively.
Figure 13B:
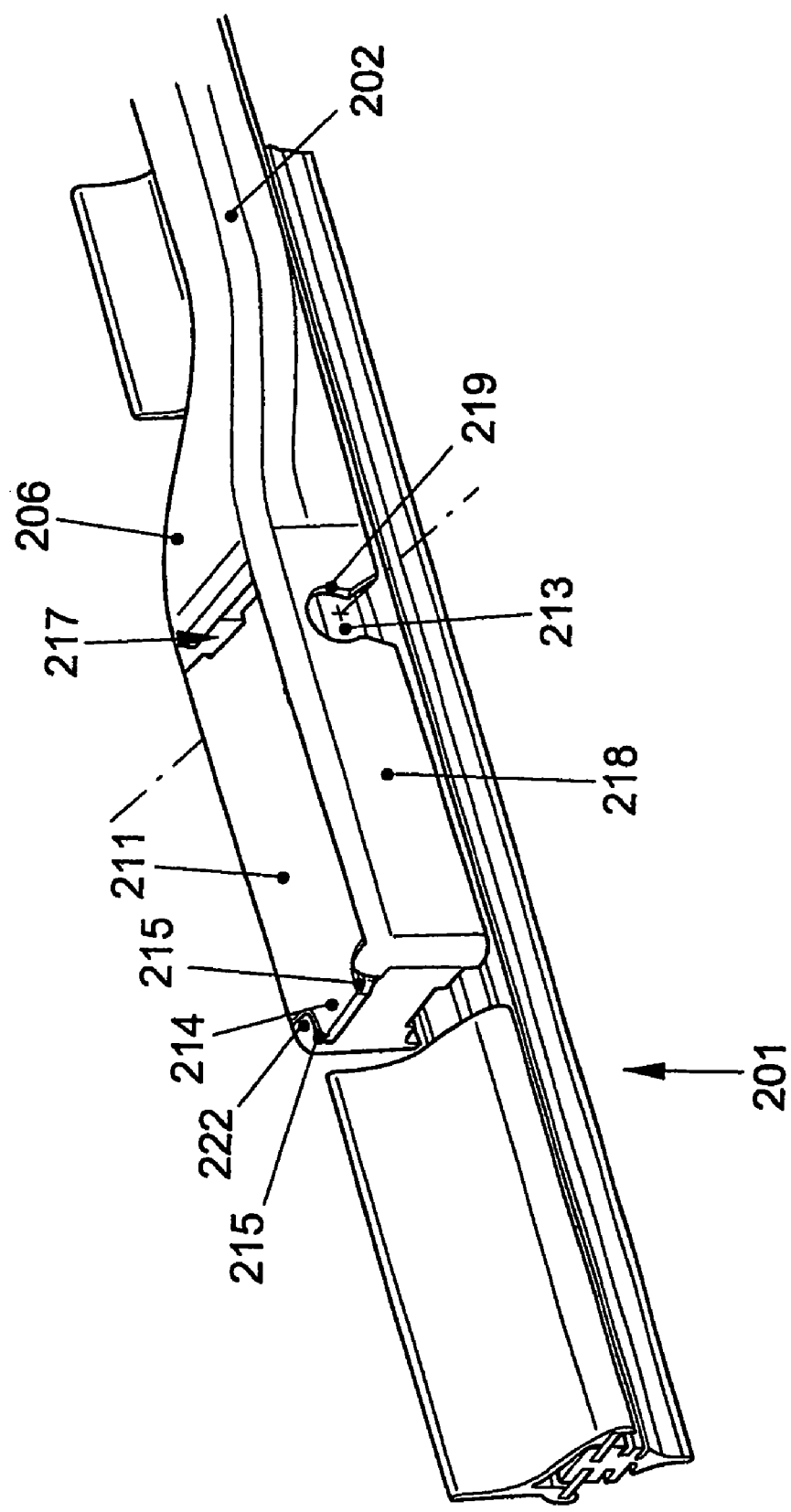

FIGS. 13A and 13B show an alternative connecting device for a wiper blade 201 on the end piece 206 of a wiper arm 202 of a windshield wiper of a windshield wiper system. The wiper blade 201 has a supporting element, which is formed from two spring rails 203, for a wiper strip 204 with a wiping lip 205 and a holding device 207. The latter fits with a base plate 208 over the wiper strip 204 on the side facing away from the wiper lip 205 and is fastened in a clamping manner to the outer edges of the spring rails 203 by means of claw-like feet 209. Two fastening tabs 210 are formed on the base plate 208 parallel to the longitudinal extent of the wiper blade 201 and in a manner such that they are extended to the side facing away from the wiper strip 204, on which fastening tabs an adapter bracket 211 of U-shaped cross section, which bracket is designed as a closure clip, is mounted pivotally by means of a bolt 212 which is shaped at its two free ends to form a respective flattened connecting stud 213, the bolt 212 being secured rotatably on the fastening tabs 210, and the closure clip 211 being connected in a rotationally fixed manner to the bolt 212 and the connecting studs 213. A tongue 214 with two laterally formed lowering means 215 is integrally formed on the closure clip 211.

The end piece 206, which is matched to the adapter bracket 211, has a recess 217 on the side facing away from the wiper blade 210 and, on its two elongate side walls 218, has a respective hollow cylindrical latching receptacle 219 with a recess 220 formed in the radial direction for the form-fitting reception of the adapter bracket 211, with the clear width of the introductory opening formed for said adapter bracket corresponding to the thickness of the flattened connecting stud 213 and the diameter of the latching receptacle 219 corresponding to the diameter of the connecting stud 213. On the end side of the end piece 206, two latching projections 222 are formed at the upper end of a hollow 221. FIG. 13a shows the wiper blade 201 in the installation position with respect to the wiper arm 202, wherein position the adapter bracket 211 is placed upright and the connecting studs 213 are arranged with their flattened sides essentially perpendicular to the wiper blade 201.

In order to install the wiper blade 201, the adapter bracket 211, which is designed as a closure clip, is pushed through the recess 217 until the two connecting bolts 213 engage in the latching receptacles 219. The adapter bracket 211 is subsequently pivoted through 90° in the direction of the end piece 206. In this case, the two limbs of the adapter bracket 211 bear in a form-fitting manner against the inner side of the latching tabs 210, and the connecting studs 213 latch in a form-fitting manner to the latching receptacles 219. In its end position, the closure clip 211 latches with the tongue 214, which is integrally formed thereon, in the region of its lowering means 215 to the latching projections 222. In this latching position (FIG. 13B), the connecting studs 213 situated in a parallel position to the wiper blade 201 and transversely to the radially arranged recesses 220 and the latter are likewise situated in the same positions with respect to the end piece 206 and to the wiper arm 202, with so much clearance being provided between the lower edges of the end piece 206 and the wiper blade 201 that the wiper blade 201 can execute operationally induced swinging movements on the wiper arm 202.

Figure 14C:
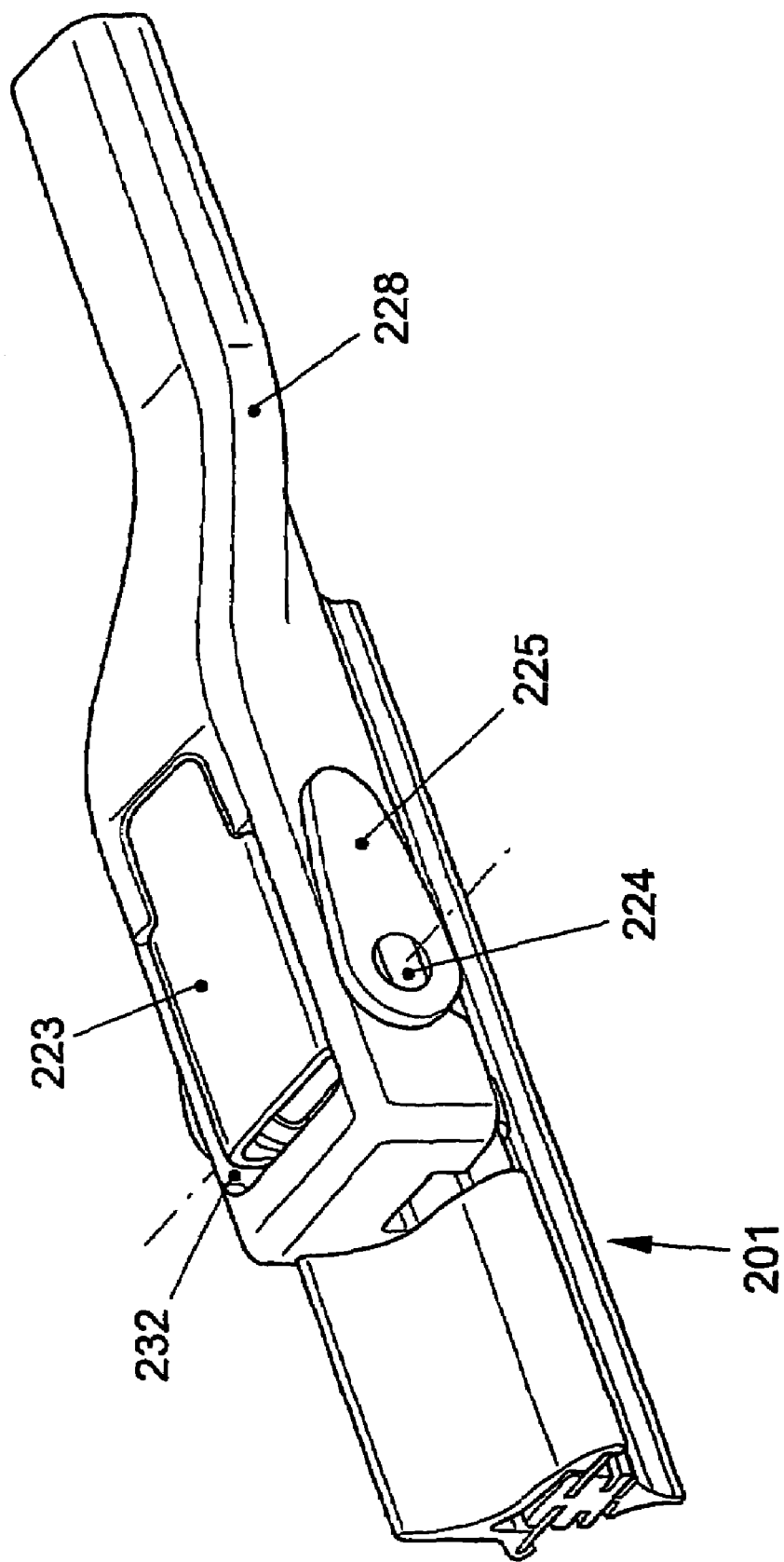
FIG. 14C is a perspective view of the alternative embodiment in its assembled position.

In contrast to the previously described embodiment, in the case of the embodiment of a connecting device that is shown in FIGS. 14A to 14C, actuating levers 225 are arranged in a rotationally fixed manner at the free ends of the flattened connecting studs 224, which are connected in a rotationally fixed manner to an adapter bracket 223 designed as a closure clip, with a gap 226 being formed between said actuating levers and the respective limb of the adapter bracket 223 (FIG. 14B). FIG. 14A shows the wiper blade 227 in its installation position with respect to the wiper arm 228, on the end piece of which latching receptacles 230 having recesses 231 are formed on the two side walls 229 and a recess 232 is provided on the side facing away from the wiper blade 227. For installation, the adapter bracket 223, which has been placed upright, is pushed into this recess 232, the side walls 229 sliding into the respective gap 226 and the connecting studs 224 sliding into the latching receptacles 230. The adapter bracket 223 is subsequently pivoted through 90°. In its end position, said adapter bracket latches with the fastening tabs 233 of the holding device. For this purpose, a latching receptacle 234 for a latching projection 235, which is formed on the inner side of the respective limb of the adapter bracket 223, is provided in each of the fastening tabs 233. FIG. 14C shows the wiper blade 227 mounted to the wiper arm 228.

Figure 15:
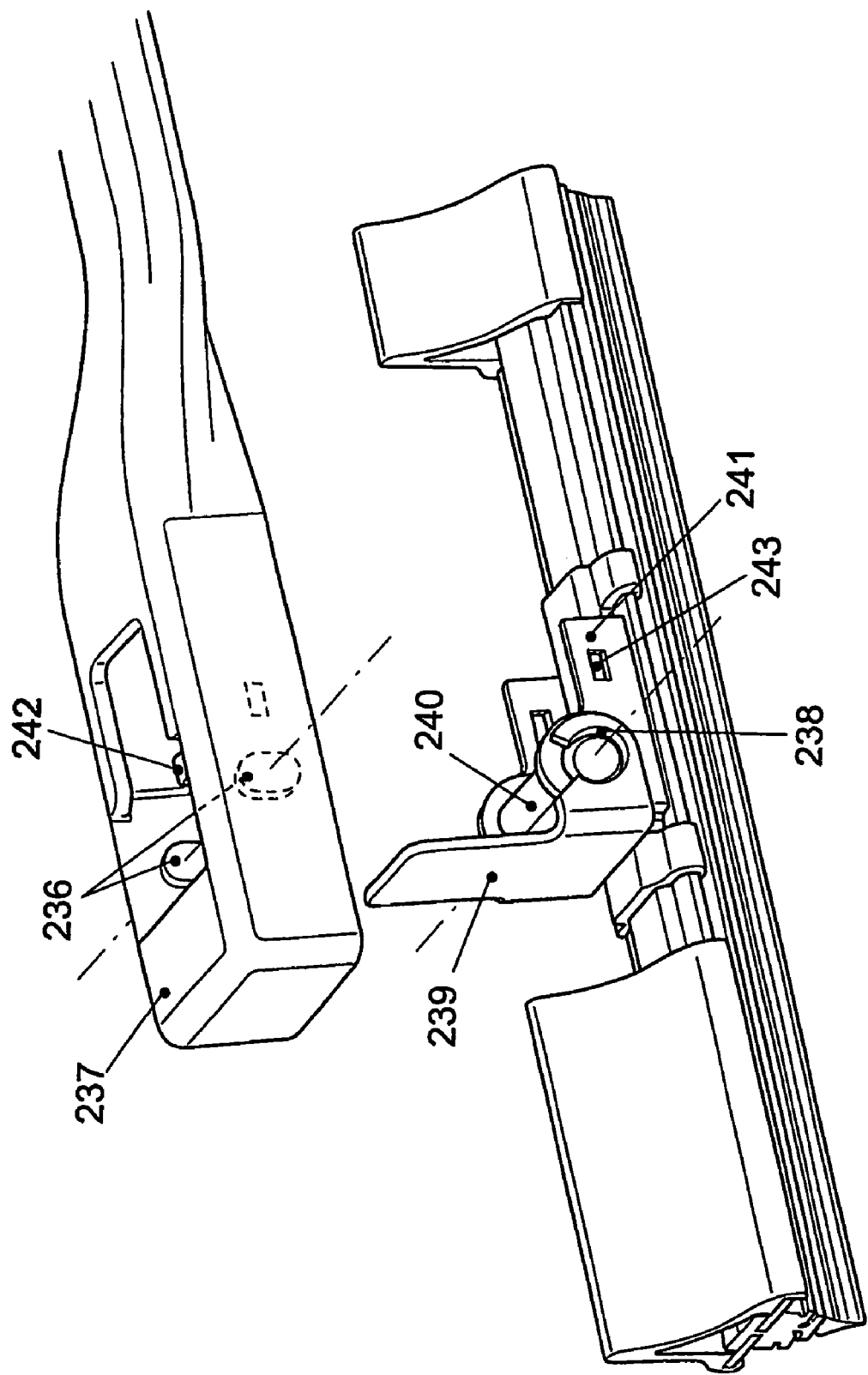
FIG. 15 is a perspective view of another embodiment of the invention, with the device in a preassembly position.

In the embodiment according to FIG. 15, the connecting studs 236 are arranged in each case on the inner side of the longitudinal side walls of the end piece 237, and the latching receptacles 238 for them are arranged in a rotationally fixed manner on an adapter bracket 239, which is designed as a closure clip and is mounted rotatably on the fastening tabs 241 via a hollow shaft 240 connected to it in a rotationally fixed manner. Latching elements 242, 243 for the mutual engagement in the latching position are arranged on the longitudinal side walls and the fastening tabs 241.

I claim:

1. A connecting device for a wiper blade on the wiper arm of a vehicle wiper system, said wiper blade being formed from a resilient supporting element with a wiper strip, the connecting device comprising:

a holding device fastened to outer edges of the supporting element;

a connecting bolt disposed on the holding device and extending transversely to a longitudinal extent of the wiper blade;

an adapter bracket articulated on said connecting bolt;

an end piece disposed on the wiper arm and matched to said adapter bracket for releasably connecting said end piece to said adapter bracket via a latching connection or locking means and fixedly connecting in an assembled state;

said adapter bracket being configured to enable said connecting bolt, and the wiper blade, to execute a swinging movement relative to said adapter bracket, with the swinging movement being caused and defined by an arching of the windshield;

said end piece engaging under said adapter bracket by way of two guide rails;

retaining devices being provided on at least one of said adapter bracket and said holding device, and wherein stop means formed on said end piece are in engagement with said retaining devices in a working position of the windshield wiper on the vehicle window such that said end piece is nonreleasably connected to said adapter bracket in the working position;

wherein a stop bracket is formed on at least one outer side of said adapter bracket and directed counter to said end piece, and a retaining bracket, which is integrally formed on at least one outer side of said holding device on a wiper-arm end thereof serve as said retaining devices, and wherein the respective said guide rail has end sides serving as a stop means for said retaining devices.

2. The connecting device according to claim 1, wherein said adapter bracket is a hood-shaped cast or molded part enclosing said holding device and formed of a dimensionally stable material, and having bearings formed thereon for said connecting bolt.

3. The connecting device according to claim 1, wherein said end piece of the wiper arm fits over said adapter bracket at least substantially with a form-fit.

4. The connecting device according to claim 1, wherein said adapter bracket has a side facing the wiper blade and spaced a distance therefrom permitting the swinging movement.

5. The connecting device according to claim 1, wherein a resilient tongue with a latching knob is integrally formed on said adapter bracket, on a side facing away from the wiper blade, and a latching opening for said latching knob is formed on said end piece.

* * * * *